United States Patent
Idei et al.

(10) Patent No.: US 10,853,365 B2
(45) Date of Patent: Dec. 1, 2020

(54) DATABASE MANAGEMENT SYSTEM, COMPUTER, AND DATABASE MANAGEMENT METHOD

(71) Applicants: HITACHI, LTD., Tokyo (JP); THE UNIVERSITY OF TOKYO, Tokyo (JP)

(72) Inventors: Hideomi Idei, Tokyo (JP); Norifumi Nishikawa, Tokyo (JP); Shinji Fujiwara, Tokyo (JP); Kazuhiko Mogi, Tokyo (JP); Kazuo Goda, Tokyo (JP); Masaru Kitsuregawa, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 331 days.

(21) Appl. No.: 15/113,448

(22) PCT Filed: Mar. 28, 2014

(86) PCT No.: PCT/JP2014/059275
§ 371 (c)(1),
(2) Date: Jul. 22, 2016

(87) PCT Pub. No.: WO2015/145762
PCT Pub. Date: Oct. 1, 2015

(65) Prior Publication Data
US 2017/0004172 A1    Jan. 5, 2017

(51) Int. Cl.
*G06F 16/245* (2019.01)
*G06F 16/2453* (2019.01)
*G06F 16/21* (2019.01)

(52) U.S. Cl.
CPC ...... *G06F 16/24542* (2019.01); *G06F 16/217* (2019.01); *G06F 16/24549* (2019.01)

(58) Field of Classification Search
CPC ............... G06F 17/30575; G06F 16/24532
See application file for complete search history.

(56) References Cited

U.S. PATENT DOCUMENTS 5,734,884 A * 3/1998 Eberhard ............... G06F 11/34
7,958,159 B1 * 6/2011 Tran ................. G06F 17/30507
707/634

(Continued)

FOREIGN PATENT DOCUMENTS

JP    2007-034414 A    2/2007

OTHER PUBLICATIONS

Oracle Database, Data Warehousing Guide, 11g Release 2 (11.2), Sep. 2007 (Year: 2007).*

(Continued)

*Primary Examiner* — Brittany N Allen
(74) *Attorney, Agent, or Firm* — Mattingly & Malur, PC

(57) ABSTRACT

As an I/O method of issuing an I/O request, there are a synchronous I/O method, in which a task is in a waiting state until an I/O response to the I/O request is returned and an asynchronous I/O method, in which another task can be executed before an I/O response to the I/O request is returned. When issuing an I/O request in execution of a task, a DBMS selects any one of the synchronous I/O method and the asynchronous I/O method, based on an I/O response speed of an I/O destination storage device and issues an I/O request according to the selected I/O method.

13 Claims, 13 Drawing Sheets

(56) References Cited

U.S. PATENT DOCUMENTS

| | | | | |
|---|---|---|---|---|
| 8,341,115 B1* | 12/2012 | Natanzon | ............ | G06F 11/1471 |
| | | | | 707/613 |
| 8,788,658 B2* | 7/2014 | Ashok | ................... | G06F 3/0613 |
| | | | | 709/224 |
| 8,868,797 B1* | 10/2014 | Kirac | ...................... | G06F 3/061 |
| | | | | 710/15 |
| 9,959,313 B2* | 5/2018 | Kitsuregawa | ..... | G06F 16/24549 |
| 10,216,651 B2* | 2/2019 | Ashmore | ................ | G06F 12/16 |
| 2006/0248306 A1* | 11/2006 | Suishu | .................. | G06F 3/0605 |
| | | | | 711/170 |
| 2007/0022100 A1 | 1/2007 | Kitsuregawa et al. | | |
| 2008/0189350 A1* | 8/2008 | Vasa | ................... | H04L 41/5003 |
| | | | | 709/201 |
| 2009/0138884 A1* | 5/2009 | Kakeda | ............... | G06F 11/0757 |
| | | | | 718/104 |
| 2011/0145220 A1* | 6/2011 | Kosuru | ............. | G06F 17/30445 |
| | | | | 707/718 |
| 2012/0005188 A1* | 1/2012 | Yu | ..................... | G06F 17/30445 |
| | | | | 707/718 |
| 2012/0254484 A1* | 10/2012 | Yang | ....................... | G06F 9/545 |
| | | | | 710/47 |
| 2013/0297872 A1* | 11/2013 | Hyde, II | ................. | G06F 3/061 |
| | | | | 711/117 |
| 2014/0281121 A1* | 9/2014 | Karamcheti | .......... | G06F 9/4881 |
| | | | | 711/102 |
| 2015/0278331 A1* | 10/2015 | Blea | ....................... | G06F 16/27 |
| | | | | 707/610 |

OTHER PUBLICATIONS

Oracle Database, VLDB and Partitioning Guide, 11g Release 2 (11.2), Sep. 2011 (Year: 2011).*

Mohhan et al., Parallelism in relational database management systems, IBM systems journal, 1994 (Year: 1994).*

Assaf Natanzon, Dynamic Synchronous/Asynchronous Replication, 2013 ACM (Year: 2013).*

International Search Report of PCT/JP2014/059275 dated May 20, 2014.

* cited by examiner

DB management information
124

| DB file path | Size | Device file path |
|---|---|---|
| /db/file10 | 1TByte | /dev/sdd0 |
| /db/file11 | 5TByte | /dev/sde0 |
| /db/file20 | 20TByte | /dev/sdf0 |
| /db/file21 | 20TByte | /dev/sdg0 |
| : | : | : |

DB file information
200

| DB data area ID | DB data area size | DB file path |
|---|---|---|
| 10 | 1TByte | /db/file10 |
| 20 | 5TByte | /db/file11 |
| 30 | 40TByte | /db/file20 |
|  |  | /db/file21 |
| : | : | : |

DB data area information
202

FIG. 3A

| Schema ID 300 | Schema name 302 | Schema type 304 | DB data area ID 306 | Data size 308 |
|---|---|---|---|---|
| 256 | Tbl0 | Table | 30 | 1TByte |
| 257 | Idx0 | Index | 10 | 100MByte |
| 260 | Tbl1 | Table | 30 | 2TByte |
| 261 | Idx1 | Index | 20 | 200MByte |
| : | : | : | : | : |

DB schema management information
204

FIG. 3B

| Device file path 320 | I/O count 322 | Average of I/O response time 324 |
|---|---|---|
| /dev/sdd0 | 1215 | 2μsec |
| /dev/sde0 | 5028 | 1msec |
| /dev/sdf0 | 34771 | 25msec |
| /dev/sdg0 | 39052 | 33msec |
| : | : | : |

Storage device performance information
126

FIG. 4A

| CPU core count | 64 | 400 |
| CPU core parallel execution count | 2 | 402 |
| Real thread count | 128 | 404 |
| User thread count | 512 | 406 |
| I/O method selection threshold | 10μsec | 408 |

System information
128

FIG. 4B

| Query ID (430) | Processing block ID (432) | Process type (434) | Access schema ID (436) | Left processing block ID (438) | Right processing block ID (440) | Search condition (442) |
|---|---|---|---|---|---|---|
| 2 | 0 | Nest Join | - | 1 | 2 | - |
| 2 | 1 | Table Scan | 256 | - | - | Tbl0.N=100 |
| 2 | 2 | Index Scan | 256 257 | - | - | Tbl0.N=Tbl1.M |

Query execution plan information
130

FIG. 5A

| Device file path | Device type | Size | Apparatus ID | LUN |
|---|---|---|---|---|
| /dev/sdd0 | FMD | 1TByte | NULL | NULL |
| /dev/sde0 | FMD | 5TByte | 0x002a1282 | 10 |
| /dev/sdf0 | HDD | 20TByte | 0x002a1282 | 12 |
| /dev/sdg0 | HDD | 20TByte | 0x002a1282 | 14 |
| : | : | : | : | : |

OS management information
142

FIG. 5B

| LUN | Logical page address | Device number | Device type | Physical page address |
|---|---|---|---|---|
| 10 | 0 -- 4095 | 0 | FMD | 0 – 4095 |
|  | 4096 – 8191 | 1 | FMD | 0 – 4095 |
|  | 8192 – 12287 | 2 | FMD | 0 – 4095 |
|  | : | : | : | : |
| 12 | 0 -- 4095 | 50 | HDD | 0 – 4095 |
|  | 4096 – 8191 | 51 | HDD | 0 – 4095 |
|  | 8192 – 12287 | 52 | HDD | 0 – 4095 |
|  | : | : | : | : |
| : | : | : | : | : |

Storage management information
174

DATABASE MANAGEMENT SYSTEM, COMPUTER, AND DATABASE MANAGEMENT METHOD

TECHNICAL FIELD

This invention generally relates to I/O (input/output) of data and relates to database management techniques, for example.

BACKGROUND ART

Many applications based on databases are present, and a database management system (hereinafter, a DBMS) that performs a series of processes and managements relating to databases has become important. One of the features of the database (hereinafter, a DB) is its ability to deal with a large amount of data. Thus, in general, when a plurality of storage devices stores the DB data and a DBMS processes the DB, I/Os (accesses) to storage devices that maintain the DB data occur. In particular, in very large scale DBs of a petabyte class, a process of finding certain specific data from the DE data incurs an enormous amount of time.

A technique disclosed in PTL 1 is known as a technique of accelerating a search process of finding specific data among a large amount of data. According to PTL 1, a DBMS dynamically generates tasks and executing the tasks in parallel to thereby multiplex a data read request when executing one query. According to a DBMS which uses this technique, the DBMS can improve a search performance as compared to a DBMS which sequentially execute tasks in their generation order.

CITATION LIST

Patent Literature

[PTL 1]
Japanese Patent Application Publication No. 2007-34414

SUMMARY OF INVENTION

Technical Problem

A DBMS which executes tasks in parallel issues an I/O request (data read request) according to an asynchronous I/O method in order to multiplex the I/O request. The asynchronous I/O method is an I/O method capable of executing another task before an I/O response to an I/O request issued by execution of a task is returned. When the asynchronous I/O method is selected, an execution target task can be switched to another task before an I/O response to an I/O request issued in execution of a certain task is returned.

However, it is not always appropriate to select the asynchronous I/O method to execute tasks in parallel. If selection of an I/O method is inappropriate, the DBMS performance may decrease.

Such a problem may occur in another computer program or a system such as a computer system that issues an I/O request without being limited to the DBMS.

Solution to Problem

As an I/O method of issuing an I/O request, there are a synchronous I/O method, in which a task is in a waiting state until an I/O response to the I/O request is returned, and an asynchronous I/O method, in which another task can be executed before an I/O response to the I/O request is returned. When issuing an I/O request in execution of a task, a DBMS selects anyone of the synchronous I/O method and the asynchronous I/O method, based on an I/O response speed of an I/O destination storage device and issues an I/O request according to the selected I/O method.

Advantageous Effects of Invention

The DBMS performance can be improved.

BRIEF DESCRIPTION OF DRAWINGS

FIG. 3A is a diagram illustrating a configuration example of DB schema management information.
FIG. 3B is a diagram illustrating a configuration example of storage device performance information.
FIG. 4A is a diagram illustrating a configuration example of system information.
FIG. 4B is a diagram illustrating a configuration example of query execution plan information.
FIG. 5A is a diagram illustrating a configuration example of OS management information.
FIG. 5B is a diagram illustrating a configuration example of storage management information.

DESCRIPTION OF EMBODIMENTS

Hereinafter, several examples will be described with reference to the drawings. The issuing source of queries to a database management system (hereinafter, a DBMS) may be a computer program in the DBMS or may be an external computer program. For example, the query issuing source may be a computer program (for example, an application program) executed in a computer having a DBMS and may be a computer program (for example, an application program) executed by an apparatus such as a client computer coupled to the computer.

In the following description, there may be cases where processing is described using a "program" as the subject.

However, since the processing is performed while using a storage resource (for example, a memory) and/or a communication interface device (for example, a communication port) as necessary when a program is executed by a processor (for example, a CPU (Central Processing Unit)) included in a computer, a storage apparatus, or the like, the processor may also be used as the subject of the processing. Processing described using the program as the subject may be processing performed by the processor or a device (a computer, a storage apparatus, or the like) having the processor. Moreover, the processor may include a hardware circuit that performs a part or all of the processes. A program may be installed in respective controllers from a program source. The program source may be a program distribution computer or a storage medium, for example.

Moreover, in the following description, although identifiers, numbers, or names are used as identification information of components, the identification information may include other types of information instead of or in addition to these types of information.

Embodiment 1

Figure 11:
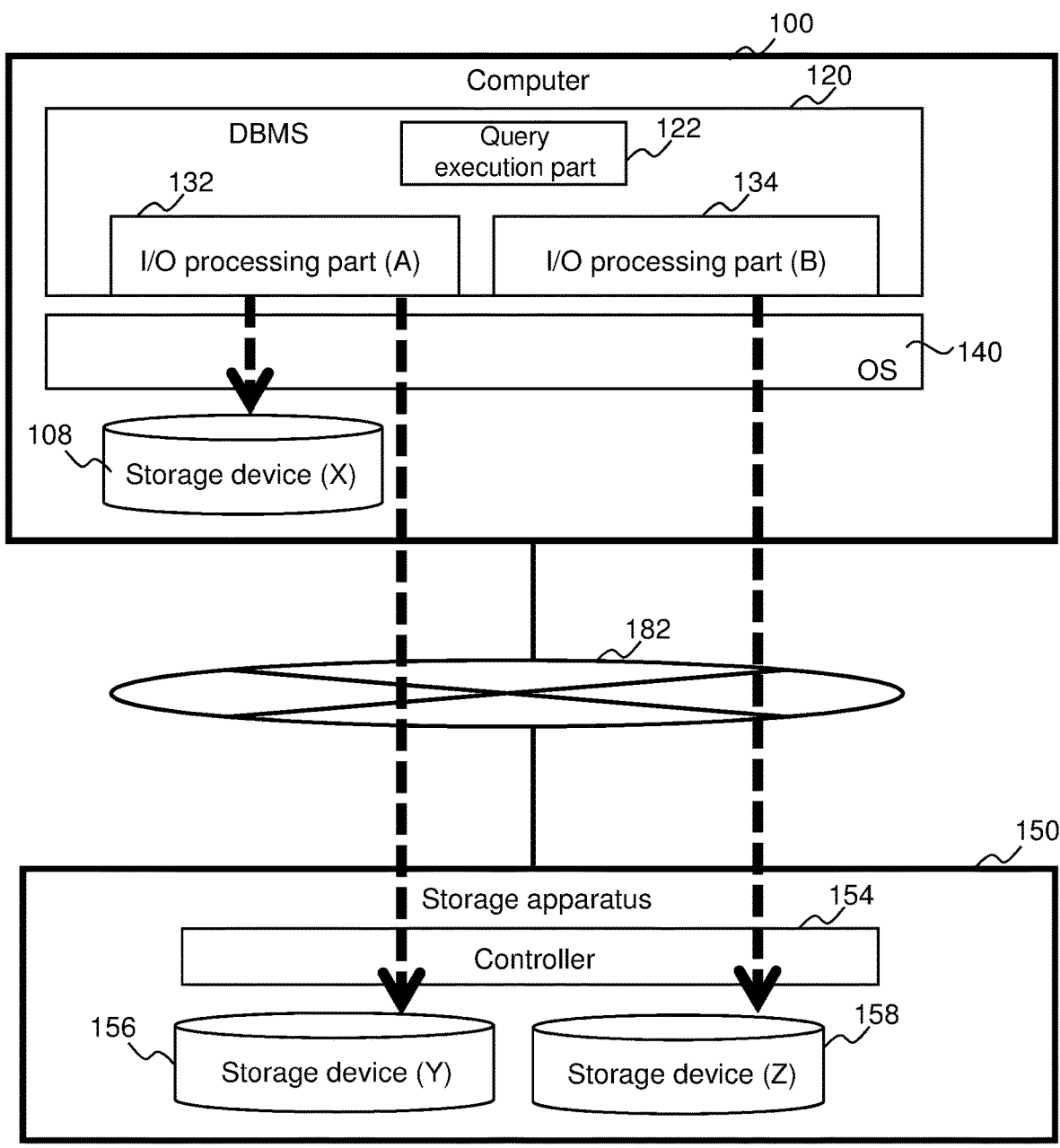
FIG. 11 is a diagram illustrating the outline of Embodiment 1.

FIG. 11 is a diagram illustrating the outline of Embodiment 1.

A storage apparatus 150 is coupled to a computer 100 via a communication network 182. The computer 100 includes a storage device (X) 108 and executes an operating system (hereinafter, an OS) 140 and a DBMS 120. The storage apparatus 150 includes a controller 154 and provides a storage device (Y) 156 and a storage device (Z) 158 to the computer 100. The storage device (X) 108, the storage device (Y) 156, and the storage device (Z) 158 stores the data of a database (hereinafter, a DB).

The DBMS 120 includes a query execution part 122, an I/O processing part (A) 132, and an I/O processing part (B) 134.

The query execution part 122 can execute at least two tasks in parallel. For example, the query execution part 122 dynamically generates tasks for executing a database operation (hereinafter, a DB operation) and executes the tasks generated dynamically. When two or more executable tasks are present, the query execution part 122 executes at least two tasks in parallel among these two or more tasks. In this way, it is possible to issue an I/O request (for example, a data read request) in a multiplexed manner. For implementation of tasks, any execution environment such as a process or a thread (real thread) managed by the OS 140, or a pseudo process, a pseudo thread (user thread), or the like implemented by an application or middleware can be used. In the present example, a real thread and a user thread execute tasks.

Examples of an I/O method used for issuing an I/O request include an asynchronous I/O method and a synchronous I/O method. The synchronous I/O method is an I/O method in which a user thread that has issued an I/O request waits until an I/O response is returned. On the other hand, the asynchronous I/O method is an I/O method in which a user thread that has issued an I/O request can execute the processing of another user thread while waiting for an I/O response. The I/O processing part (A) 132 is a module that issues an I/O request according to a synchronous I/O method and the I/O processing part (B) 134 is a module that issues an I/O request according to an asynchronous I/O method. For example, the OS 140 has a function (hereinafter, a synchronous I/O function) for the synchronous I/O method and a function (hereinafter, an asynchronous I/O function) for the asynchronous I/O method, the I/O processing part (A) 132 calls the synchronous I/O function of the OS 140 to issue an I/O request, and the I/O processing part (B) 134 calls the asynchronous I/O function of the OS 140 to issue an I/O request. When an I/O request is issued by execution of a task (in the present example, a user thread), an I/O method (an I/O processing part) by which an I/O request is to be issued is selected and the I/O request is issued by the selected I/O method (I/O processing part). When an I/O destination storage device is the storage device (X) 108 in the computer 100, the I/O to the storage device (X) 108 is performed by the OS 140 and an I/O response is received by the OS 140. When the I/O destination storage device is the storage device (Y) 156 or the storage device (Z) 158 in the storage apparatus 150, an I/O request is transmitted to the storage apparatus 150 by the OS 140, and an I/O response is sent from the storage apparatus 150 and received by the OS 140. The OS 140 transmits a completion interrupt for the received I/O response to the DBMS 120. In the case of the synchronous I/O method, the DBMS 120 having received the completion interrupt for the I/O response transfers data immediately from the OS 140 and continues processing. In the case of the asynchronous I/O method, the DBMS 120 acquires all completed I/Os and executes an I/O completion process on the individual I/O responses. The DBMS 120 may periodically check the OS 140 to see whether a completed I/O is present rather than waiting until a completion interrupt for an I/O response is received from the OS 140. Moreover, the entire portion or a partial portion of the I/O processing part (A) 132 and the entire portion or a partial portion (for example, a portion that performs an I/O process within the I/O processing part (B) 134) may be any user thread that perform the DB operation.

The storage device (X) 108, the storage device (Y) 156, and the storage device (Z) 158 each may be a physical storage device and may be a logical storage device. The physical storage device may be any storage device which includes an HDD (Hard Disk Drive), an FMD (Flash Memory Device), and another storage medium. The FMD is generally an SSD (Solid State Drive). The logical storage device may be a logical storage device which is based on one or more physical storage devices (for example, a RAID (Redundant Array of Independent Disks) group) and may be a virtual logical storage device which is based on a thin provisioning technique. The logical storage device is sometimes generally referred to as a logical volume or a logical unit (hereinafter, an LU). In the present example, the storage device (X) 108 is an FMD, the storage device (Y) 156 is a logical storage device which is based on a plurality of (or one) FMDs, and the storage device (Z) 158 is a logical storage device which is based on a plurality of (or one) HDDs. Moreover, in the present example, the logical storage device is sometimes referred to as an "LU." Even when an I/O destination storage device is an LU, an I/O to a physical area (a physical storage device having the physical area) corresponding to an I/O destination area of the LU eventually occurs.

At least two storage devices among the storage device (X) 108, the storage device (Y) 156, and the storage device (Z) 158 have different I/O response speeds (I/O response time). For example, the I/O response of the storage device (Z) 158 among the storage device (X) 108, the storage device (Y) 156, and the storage device (Z) 158 is the slowest, and the I/O response of the storage device (X) 108 is the fastest. The I/O response of the storage device (Y) 156 is faster than the I/O response of at least the storage device (Z) 158 and is equal to or slower than the I/O response of the storage device (X) 108.

The DBMS 120 has I/O response speed information (not illustrated). The I/O response speed information includes an I/O response speed of each storage device that stores DB data. The I/O response speed is a value indicating the speed (for example, an I/O response time) of an I/O response and may be a fixed value or a variable value. The I/O response speed may be an externally input value (a value input from the outside of the computer 100), may be a measurement value (a value repeatedly measured by the DBMS 120), and may be a value decided based on both the externally input value and the measurement value. The externally input value may be a value input to the computer 100 by an administrator and may be a value acquired from the storage apparatus 150. When the I/O response measurement value is a value decided based on both the externally input value and the measurement value, the externally input value is an ideal value (for example, a value on specifications) of the I/O response time of a storage device and the measurement value is a value of the bandwidth of a path to the storage device, for example.

In execution of each task, when issuing an I/O request, the query execution part 122 selects an I/O method based on the I/O response speed of an I/O destination storage device by referring to I/O response speed information and issues the I/O request using the I/O processing part 132 or 134 corresponding to the selected I/O method. For example, the query execution part 122 selects the I/O method based on whether the I/O response speed of the I/O destination storage device is suitable for the condition of the synchronous I/O method or the asynchronous I/O method. In the example of FIG. 11, the condition of the synchronous I/O method is that the I/O response speed exceeds a predetermined speed (for example, the I/O response time is shorter than a predetermined time), and the condition of the asynchronous I/O method is that the I/O response speed is equal to or lower than a predetermined speed (for example, the I/O response time is equal to or shorter than a predetermined time). It is assumed that the I/O response speed of each of the storage device (X) 108 and the storage device (Y) 156 exceeds the predetermined speed, and the I/O response speed of the storage device (Z) 158 is lower than the predetermined speed. Due to this, the query execution part 122 selects the synchronous I/O method (the I/O processing part (A) 132) when the I/O destination is the storage device (X) 108 or the storage device (Y) 156 and selects the asynchronous I/O method (the I/O processing part (B) 134) when the I/O destination is the storage device (Z) 158.

According to the asynchronous I/O method, an overhead occurs. An overhead is the switching of an execution target task (in the present example, a user thread) to another task before an I/O response is returned and is an I/O completion process (for example, including a collective harvest which is a process of acquiring, from the OS 140, all I/O responses which have been received and maintained by the OS 140). When a storage device having a slow I/O response is an I/O destination, it can be thought that the overhead is relatively negligible. However, when a storage device having a fast I/O response is an I/O destination, there is a possibility that the performance of the DBMS 120 may decreased due to the overhead. According to the present example, an I/O request can be issued according to an I/O method corresponding to the I/O response speed of an I/O destination storage device. In this way, the performance of the DBMS 120 can be improved. Specifically, since an I/O request to a storage device having a fast I/O response is issued according to the synchronous I/O method, an overhead such as switching of a user thread and an I/O completion process can be reduced. Moreover, since an I/O request to a storage device having a slow I/O response is issued according to the asynchronous I/O method, the CPU can be used by another user thread in a period in which the CPU is in a waiting state.

Hereinafter, the present example will be described in detail.

Figure 1:
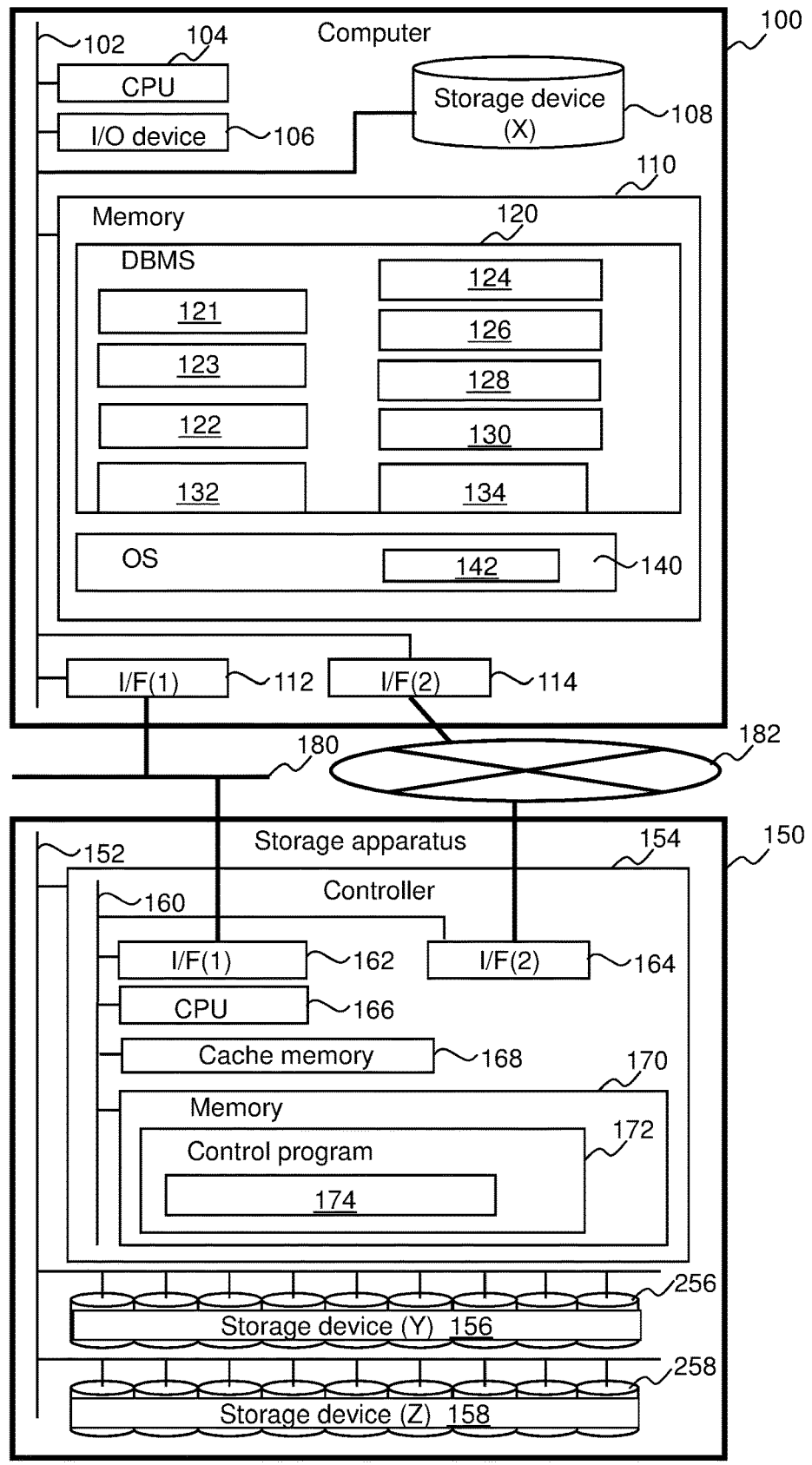
FIG. 1 is a diagram illustrating a configuration example of a computer system according to Embodiment 1.

FIG. 1 is a diagram illustrating a configuration example of a computer system according to Embodiment 1.

The computer 100 and the storage apparatus 150 are coupled via communication networks 180 and 182. The computer 100 executes the DBMS 120 that manages DB data stored in the storage apparatus 150. The communication network 180 may be a network such as a LAN (Local Area Network) or a WAN (Wide Area Network), for example, and the communication network 182 may be a network (for example, a SAN (Storage Area Network)) formed of a fiber channel or the like. In FIG. 1, although only one computer 100 and only one storage apparatus 150 are illustrated, a plurality of computers and a plurality of storage apparatuses may be provided. Moreover, the computer 100 and the storage apparatus 150 may be coupled via one communication network instead of different communication networks 180 and 182.

The computer 100 includes a CPU (processor) 104, an I/O (input/output) device 106, the storage device (X) 108, a memory 110, an I/F (1) 112 (an interface device to the communication network 180), and an I/F (2) 114 (an interface device to the communication network 182) which are coupled by an internal bus 102. The storage device (X) 108 may be directly coupled to the CPU 104 rather than the internal bus 102. In at least one of the storage device (X) 108 and the memory 110, the DBMS 120 and the OS 140 are stored and are executed by the CPU 104.

The DBMS 120 includes a query reception part 121, a query execution plan generation part 123, a query execution part 122, the I/O processing part (A) 132, and the I/O processing part (B) 134. The query reception part 121 receives a query to a DB. The query execution plan generation part 123 generates a query execution plan including processing blocks, which is information indicating a DB operation necessary for executing the received query. The query execution part 122 executes the query based on the generated query execution plan, dynamically generates tasks for executing the DB operation in execution of the query, and executes a plurality of tasks generated dynamically in parallel. In this way, the query execution part 122 issues an I/O request (data read request) to the DB in a multiplexed manner. For example, in execution of the query, the query execution part 122 performs: (a) generating a task for executing a DB operation; (b) executing the generated task to issue a read request to the DB in order to read data necessary for the DB operation corresponding to the task as necessary; (c) when an (N+1)th (N is an integer of 1 or more) DB operation is executed based on an N-th DB operation corresponding to the task executed in (b), generating a new task based on the execution result; and (d) performing (b) and (c) for each of the newly generated task, wherein in (b) and (d), when two or more executable tasks are present, at least two tasks among these two or more tasks are executed in parallel. The I/O processing part (A) 132 and the I/O processing part (B) 134 each are used for issuing an I/O request in execution of a query. The I/O processing part (A) 132 issues an I/O request according to the synchronous I/O method and the I/O processing part (B) 134 issues an I/O request according to the asynchronous I/O method. The number of at least one of the I/O processing parts 132 and 134 may be two or more. Moreover, although at least the synchronous I/O method and the asynchronous I/O method are present, a larger number of I/O methods may be present. The I/O processing parts 132 and 134 each serve as an interface to the OS 140.

The DBMS 120 maintains DB management information 124 used for management of a DB, storage device performance information 126 on the I/O response speed of a storage device, system information 128 on a system (in the present example, a computer) which includes the DBMS 120, and query execution plan information 130 indicating a query execution plan generated based on a query.

The OS 140 maintains OS management information 142 that correlates a logical device on the OS 140 and a storage device (the storage device (X) 108 in the computer 100, the storage device (Y) 156 and the storage device (Z) 158 on the storage apparatus 150, and the like) with each other. The OS management information 142 can be also referred to from the DBMS 120.

The storage apparatus 150 includes a controller 154, a plurality of FMDs 256, and a plurality of HDDs 258. These components are coupled by an internal bus 152. The plurality of FMDs 256 forms one or more RAID groups, and the storage device (Y) 156 is provided based on the one or more RAID groups. Similarly, the plurality of HDDs 258 forms one or more RAID groups, the storage device (Z) 158 is provided based on the one or more RAID groups. In FIG. 1, although only one controller 154 is illustrated, a plurality of controllers may be provided.

The controller 154 includes an I/F (1) 162 (an interface device to the communication network 180), an I/F (2) 164 (an interface device to the communication network 182), a CPU (processor) 166, a cache memory 168, and a memory 170 which are coupled by an internal bus 160, for example. In the memory 170, a control program 172 that controls the storage apparatus 150 is stored and is executed by the CPU 166. The control program 172 maintains storage management information 174 that correlates a physical storage device and LUs (the storage devices 156 and 158) of the storage apparatus 150 with each other.

Although the query reception part 121, the query execution plan generation part 123, the query execution part 122, the I/O processing part (A) 132, and the I/O processing part (B) 134 are realized when the DBMS 120 is executed by the CPU 104, at least a portion of processes performed by at least one of these components may be realized by hardware. A computer program including the DBMS 120 may be installed in the computer 100 from a program source. The program source may be a storage medium that can be read by the computer 100, for example.

The configuration of the DBMS 120 illustrated in FIG. 1 is an example only. For example, a certain component may be divided into a plurality of components, and a plurality of components may be integrated into one component.

Hereinafter, the above-described various items of information will be described in detail. In the present example, it is assumed that the setup of the DBMS 120, the configuration of the logical unit of the storage apparatus 150, the configuration of the logical device on the OS side, and the tables and indices of the DB have already been defined and the DB data has been deployed. Moreover, in line with this, it is assumed that information has already been stored in the DB management information 124, the system information 128, the OS management information 142, and the storage management information 174. It is assumed that at least one of these items of information 124, 128, 142, and 172 may be input from the outside by an administrator.

Figures 2A, 2B, 2C:
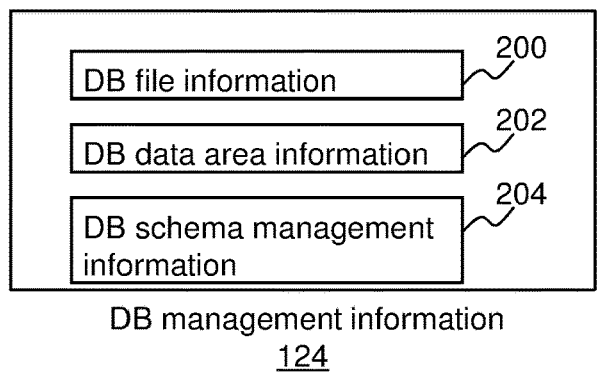
FIG. 2A is a diagram illustrating a configuration example of DB management information.
FIG. 2B is a diagram illustrating a configuration example of DB file information.
FIG. 2C is a diagram illustrating a configuration example of DB data area information.

FIG. 2A is a diagram illustrating a configuration example of the DB management information 124.

The DB management information 124 includes DB file information 200 which is information on files that deploy DB data, DB data area information 202 which is information on a data area of the DB, and DB schema management information 204 which is management information of schemas such as tables and indices of the DB.

FIG. 2B is a diagram illustrating a configuration example of the DB file information 200.

The DB file information 200 is information on mapping between a DB file that deploys DB data and a device file (logical device) on the OS 140, and has an entry for each DB file. Each entry includes a field 220 in which a DB file path (a file path for identifying a DB file) is registered, a field 222 in which the size (the size (in this example, in a byte unit) of the DB file) thereof is registered, and a field 224 in which a device file path (the path of a device file (logical device) that deploys the DB file) is registered.

FIG. 2C is a diagram illustrating a configuration example of the DB data area information 202.

The DB data area information 202 is information on mapping between a DB data area that deploys the schema of the DB and a DB file in which the DB data area is deployed, and has an entry for each DB data area. Each entry includes a field 240 in which a DB data area ID (an identifier for identifying a DB data area) is registered, a field 242 in which a DB data area size (the size of a DB data area) is registered, and a field 244 in which a DB file path (a file path of a DB file that forms the DB data area) is registered. A plurality of DB files may be set in the entry of one DB data area.

FIG. 3A is a diagram illustrating a configuration example of the DB schema management information 204.

The DB schema management information 204 is information which manages schemas such as tables and indices of a DB, and has an entry for each schema. Each entry includes a field 300 in which a schema ID (an identifier for identifying a schema) is registered, a field 302 in which a schema name (the name of the schema) is registered, a field 304 in which a schema type (the type of the schema) is registered, a field 306 in which a DB data area ID (an identifier of a DB data area in which the schema is deployed) is registered, and a field 308 in which a data size (the data size of the schema) is registered.

FIG. 3B is a diagram illustrating a configuration example of the storage device performance information 126.

The storage device performance information 126 indicates information on the I/O response speed of each storage device, and has an entry for each storage device. Specifically, the entry is present for each device file (logical device) mapped onto the storage device. Each entry includes a field 320 in which a device file path (a device file path for identifying a logical device) is registered, a field 322 in which an I/O number (the number of I/O requests issued to the storage device) is registered, and a field 324 in which an average of I/O response time is registered. That is, in the example of FIG. 3B, the I/O response speed is an average of I/O response time. The average of I/O response time is the average of one or more I/O response times in a target period. The target period is a period between a first time point (for example, a present time point) and a second time point older than the first time point. When an I/O request to a storage device is issued, the query execution part 122 counts up an I/O count corresponding to the I/O destination storage device, calculates an I/O response time of the I/O request, and updates an average of I/O response time corresponding to the I/O destination storage device based on the calculated I/O response time. The I/O response time is the time elapsed from an I/O start time point to an I/O completion time point. The I/O start time point is the start time point of an I/O process or the time point at which an I/O request is issued to the OS 140 during the I/O process. The I/O completion time point is the time point at which an I/O response is received from the OS 140 or the completion time point of an I/O process. The I/O response speed may be another type of I/O response time decided based on one or more I/O response times in a target period instead of the average of I/O response time. For example, the I/O response speed may be the longest I/O response time in the target period or the shortest I/O response time in the target period.

FIG. 4A is a diagram illustrating a configuration example of the system information 128.

The system information 128 indicates information on a system (the computer 100) which includes the DBMS 120. The system information 128 includes a field 400 in which a CPU core count (the number of CPU cores included in the CPU 104 of the computer 100) is registered, a field 402 in which a CPU core parallel execution count (the number of user threads that each CPU core can execute in parallel) is registered, a field 404 in which a real thread count (the number of real threads usable when the DBMS 120 executes tasks) is registered, a field 406 in which a user thread count (the number of user threads in one real thread usable when the DBMS 120 executes tasks) is registered, and a field 408 in which an I/O method selection threshold (a threshold compared with an average of I/O response time during selection of the I/O method) is registered. The real thread is a thread included in the OS 140, and the user thread is a pseudo thread in a real thread. The DBMS 120 generates a plurality of user threads and allocates these user threads to a plurality of real threads. According to the example of FIG. 4A, 128 real threads are present. One real thread is executed on one CPU logical core, and 512 user threads are executed while being switched in one real thread. A user thread for which the synchronous I/O method is selected is in a waiting state during a real thread until an I/O response is returned (the user thread is not switched to another user thread at least until the I/O response is returned). On the other hand, a user thread for which the asynchronous I/O method is selected is switched to another user thread after an I/O is issued, and the processing of another user thread is executed even when a certain user thread is issuing an I/O during a real thread. In the present example, tasks being generated dynamically mean that a user thread enters into an executable state when a necessary value is input to a prepared user thread.

FIG. 4B is a diagram illustrating a configuration example of the query execution plan information 130.

The query execution plan information 130 indicates information on a query execution plan generated when a query is received, and has an entry for each processing block (DB operation). Each entry includes a field 430 in which a query ID (an identifier for identifying a query) is registered, a field 432 in which a processing block ID (an identifier for identifying the processing block) is registered, a field 434 in which a process type (a process type of the processing block) is registered, a field 436 in which an access schema ID (an identifier of a schema that the processing block accesses) is registered, a field 438 in which a left processing block ID (an identifier of a left-side (previous) processing block connected to the processing block) is registered, a field 440 in which a right processing block ID (an identifier of a right-side (posterior) processing block connected to the process-ing block) is registered, and a field 442 in which a search condition (a search condition of the processing block) is registered.

FIG. 5A is a diagram illustrating a configuration example of the OS management information 142.

The OS management information 142 is information on mapping between a logical device (device file) and a storage device, and has an entry for each logical device. Each entry includes a field 500 in which a device file path (the path of a device file) is registered, a field 502 in which a device type (the type of a mapped storage device) is registered, a field 504 in which a size (the size (storage volume) of the mapped storage device) is registered, a field 506 in which an apparatus ID (an identifier of an apparatus (storage apparatus) including the mapped storage device) is registered, and a field 508 in which a LUN (Logical Unit Number) (the LUN as an identifier of the mapped LU) is registered. The storage device type registered in the field 502 is the type of a physical storage device when the mapped storage device is the physical storage device and is the type of a physical storage device which is the base of a LU when the mapped storage device is the LU. Even when the mapped storage device is the storage device (X) 108 in the computer 100, an entry is provided in the OS management information 142. In the entry, the apparatus ID and the LUN are set to "NULL."

FIG. 5B is a diagram illustrating a configuration example of the storage management information 174.

The storage management information 174 is information on mapping between a logical page (logical storage area) in the storage apparatus 150 and a physical page (physical area) in the storage apparatus 150. The LU is formed of a plurality of logical pages, and the storage management information 174 includes an entry for each logical page. Each entry includes a field 520 in which a LUN (the LUN of a LU which includes the logical page) is registered, a field 522 in which a logical page address (the address of the logical page) is registered, a field 524 in which a device number (the number as an identifier of a physical storage device which is the base of the logical page) is registered, a field 526 in which a device type (the type of a physical storage device which is the base of the logical page) is registered, and a field 528 in which a physical page address (the address of a physical page corresponding to the logical page) is registered.

Hereinafter, the details of the processes performed in the present example will be described.

Figure 6:
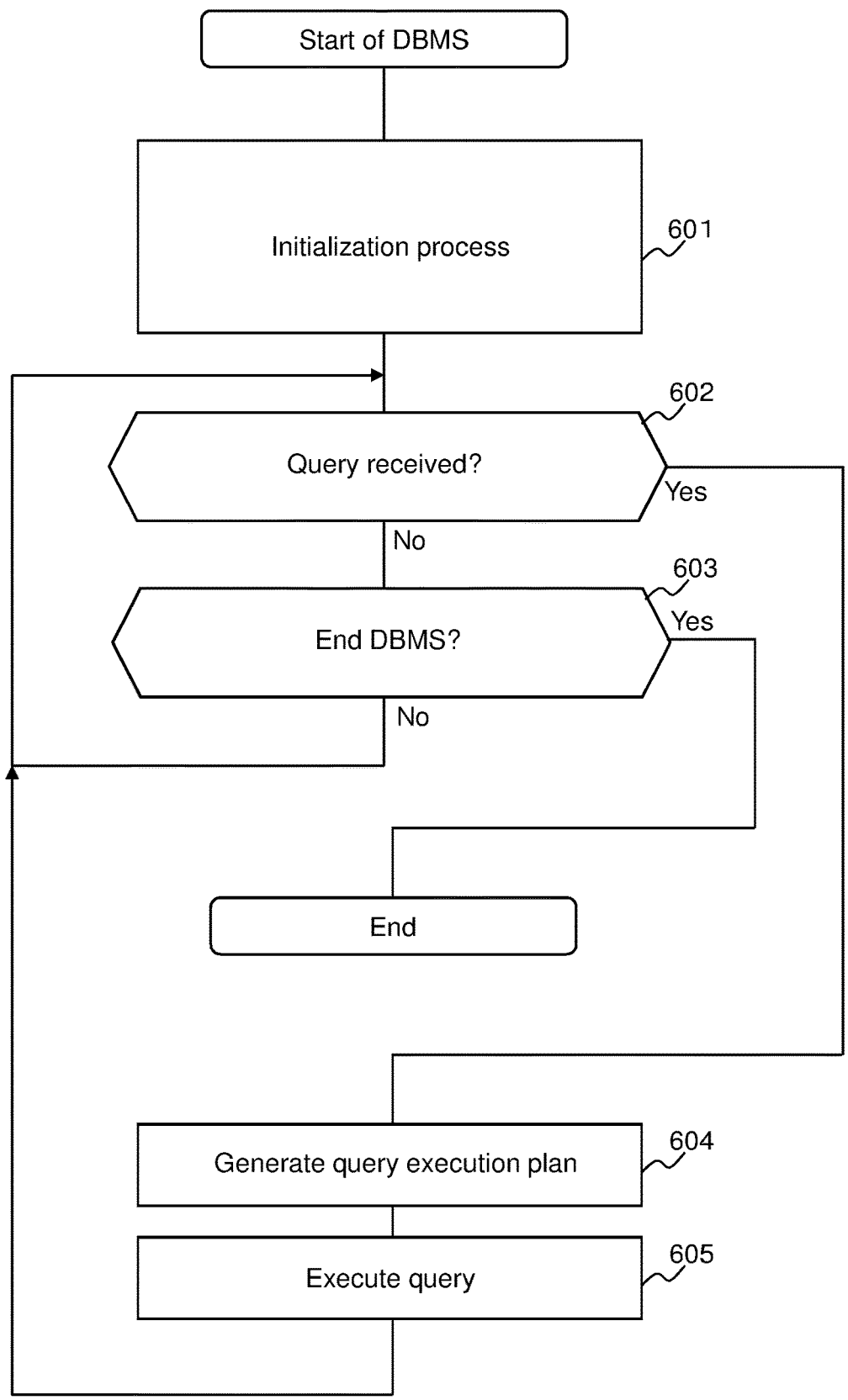
FIG. 6 is a flowchart of processes from the start to the end of a DBMS.

FIG. 6 is a flowchart of processes from the start to the end of the DBMS 120.

The DBMS 120 performs a predetermined initialization process immediately after activation (step 601). For example, the DBMS 120 initializes internal management information and establishes a connection to the outside. Moreover, for example, the DBMS 120 acquires a list of storage devices that maintain DB data based on the OS management information 142 and then generates the storage device performance information 126. In each entry of the storage device performance information 126, the field 402 in which the I/O count is registered and the field 404 in which the average of I/O response time is registered are blank. In step 601, the DBMS 120 may generate a plurality of real threads and user threads.

The DBMS 120 enters into a query reception waiting state. The query reception part 121 determines whether a query has been received (step 603). When the determination result of step 603 is false (step 602: No) (that is, in the query reception waiting state), the query reception part 121 determines whether the DBMS 120 is to be ended (step 603). The determination result of step 603 is affirmative (step 603: Yes), the DBMS 120 ends.

When the determination result of step 602 is affirmative (step 602: Yes), the DBMS escapes the query waiting state and the query execution plan generation part 123 generates a query execution plan based on the received query and registers the information of the query execution plan in the query execution plan information 130 (step 604). After that, the query execution part 122 executes the query based on the query execution plan information 130 (step 605).

Figure 7:
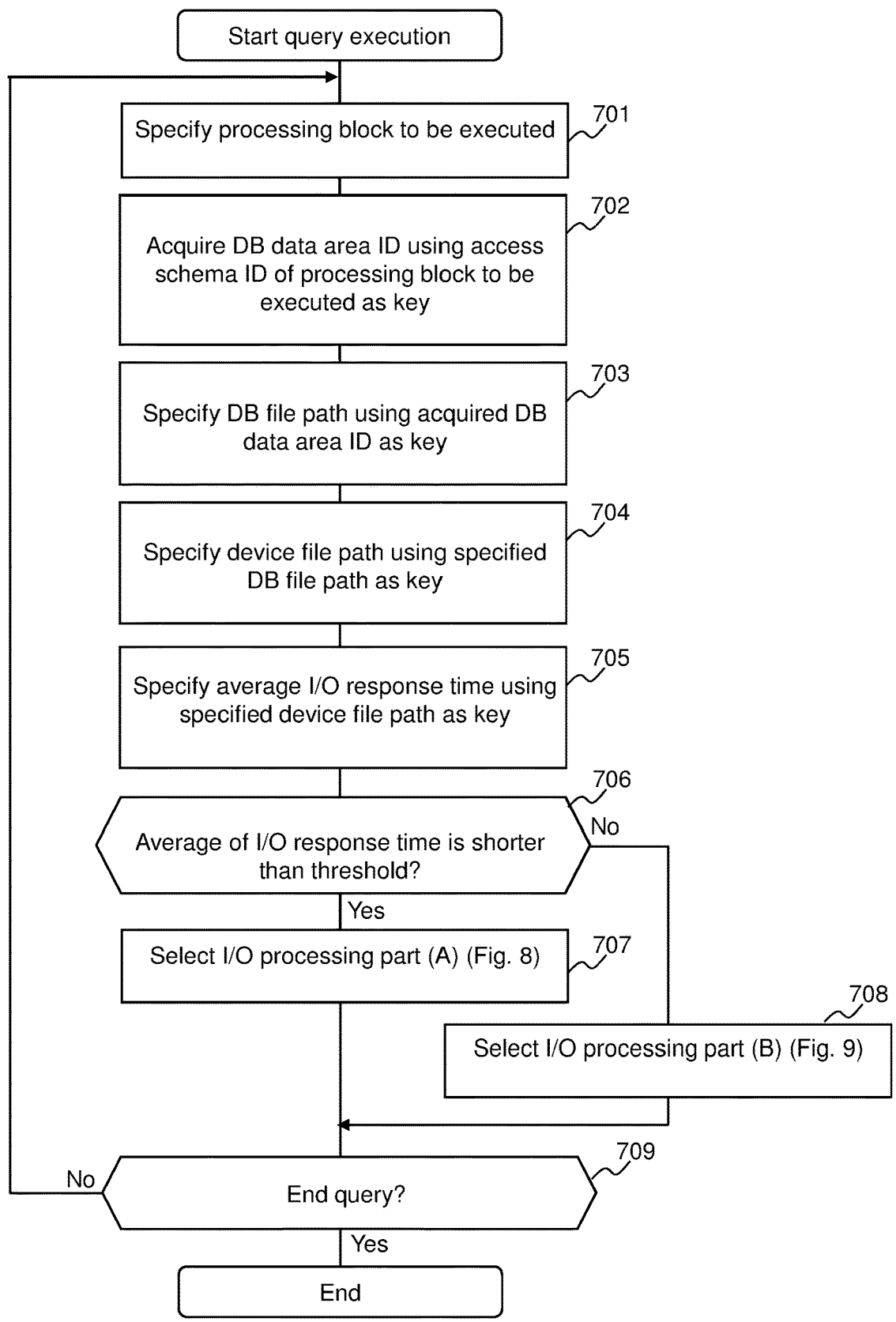
FIG. 7 is a flowchart of execution of a query.

FIG. 7 is a flowchart of execution of a query. A query to be execution may be divided into a plurality of query portions in a record level, and at least two tasks may be executed in parallel for each query portion. In this case, the flowchart of FIG. 7 is executed for one query portion.

The query execution part 122 specifies a processing block to be executed by referring to the query execution plan information 130 (step 701). Subsequently, the query execution part 122 acquires a DB data area ID in an entry which includes a schema ID identical to an access schema ID of the specified processing block from the DB schema management information 204 using the access schema ID as a key (step 702). Subsequently, the query execution part 122 specifies a DB file path in an entry which includes a DB data area ID identical to the acquired DB data area ID from the DB data area information 202 using the acquired DB data area ID as a key (step 703). Subsequently, the query execution part 122 specifies a device file path in an entry which includes a DB file path identical to the specified DB file path from the DB file information 200 using the specified DB file path as a key (step 704). Subsequently, the query execution part 122 specifies an average of I/O response time in an entry which includes a device file path identical to the specified device file path from the storage device performance information 126 using the specified device file path as a key (step 705). The specified average of I/O response time is an average of I/O response time of an I/O destination storage device.

The query execution part 122 determines whether the specified average of I/O response time is shorter than an I/O method selection threshold in the system information 128 (step 706).

When the determination result of step 706 is affirmative (step 706: Yes), the query execution part 122 selects the I/O processing part (A) 132 and sends a request for execution of an I/O process to the I/O processing part (A) 132 (step 707). On the other hand, when the determination result of step 706 is false (step 706: No), the query execution part 122 selects the I/O processing part (B) 134 and sends a request for execution of an I/O process to the I/O processing part (B) 134 (step 708). Steps 707 and 708 are performed by execution of a user thread.

After step 707 or 708 is completed, the query execution part 122 determines whether the query has ended based on the query execution plan information 130 (step 709). When the determination result of step 709 is affirmative (step 709: Yes), execution of the query ends. When the determination result of step 709 is false (step 709: No), the query execution part 122 continues processing from step 701.

Figure 8:
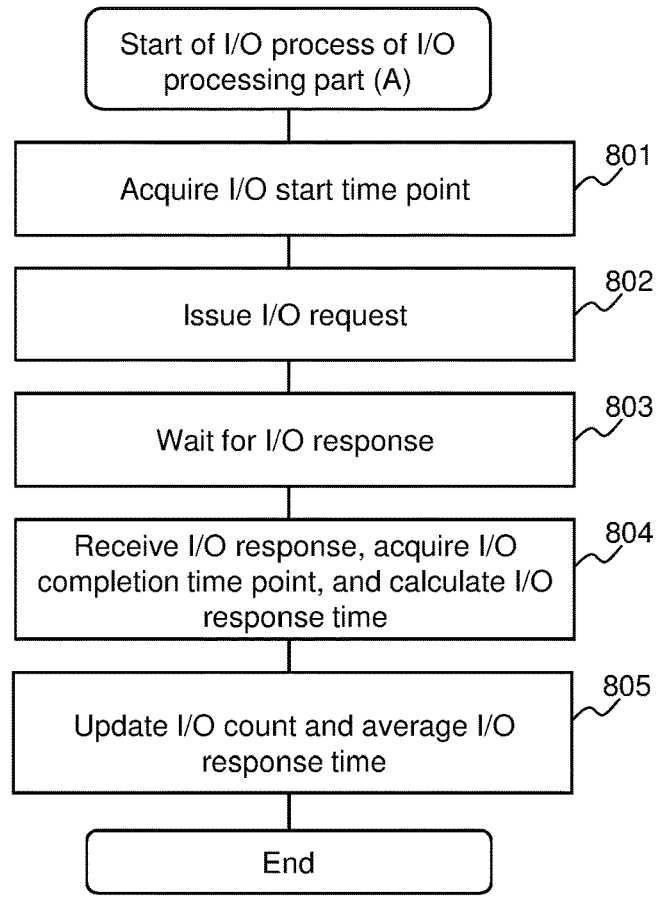
FIG. 8 is a flowchart of an I/O process of an I/O processing part (A).

FIG. 8 is a flowchart of an I/O process of the I/O processing part (A) 132.

Upon receiving a request from the query execution part 122, the I/O processing part (A) 132 acquires the start time point of an I/O process and maintains the same therein (step 801). Moreover, the I/O processing part (A) 132 issues an I/O request to the OS 140 according to the synchronous I/O method (step 802). When the OS 140 is the Linux (registered trademark), for example, the I/O start time point can be acquired by issuing a RDTSC instruction of the OS.

After the I/O request is issued, the I/O processing part (A) 132 waits until an I/O response (a response to the I/O request) is returned from the OS 140 (step 803).

When an I/O response is returned from the OS 140, the I/O processing part (A) 132 acquires an I/O completion time point (the time point at which the I/O response is received) and calculates an I/O response time (the time elapsed from the I/O start time point maintained in step 801 to the acquired I/O end time point) (step 804). Moreover, the I/O processing part (A) 132 updates the storage device performance information 126 (that is, the I/O processing part (A) 132 counts up the number of I/Os corresponding to the I/O destination storage device and updates the average of I/O response time corresponding to the I/O destination storage device) (step 805).

Figure 9:
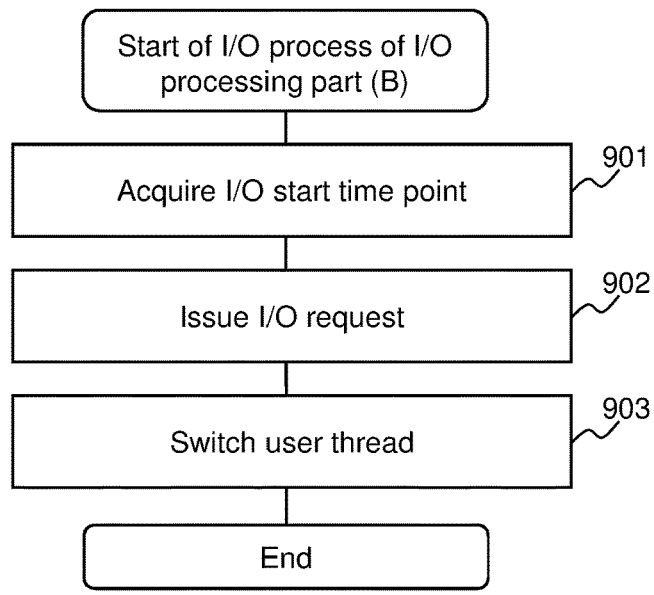
FIG. 9 is a flowchart of an I/O process of an I/O processing part (B).

FIG. 9 is a flowchart of an I/O process of the I/O processing part (B) 134.

Upon receiving a request from the query execution part 122, the I/O processing part (B) 134 acquires an I/O start time point and maintains the same therein (step 901).

Subsequently, the I/O processing part (B) 134 issues an I/O request to the OS 140 according to the asynchronous I/O method (step 902) and switches an execution target user thread from a user thread (a user thread which has issued an I/O request using the I/O processing part (B) 132) which has sent an I/O process to the I/O processing part (B) 134 to another user thread (step 903).

Figure 10:
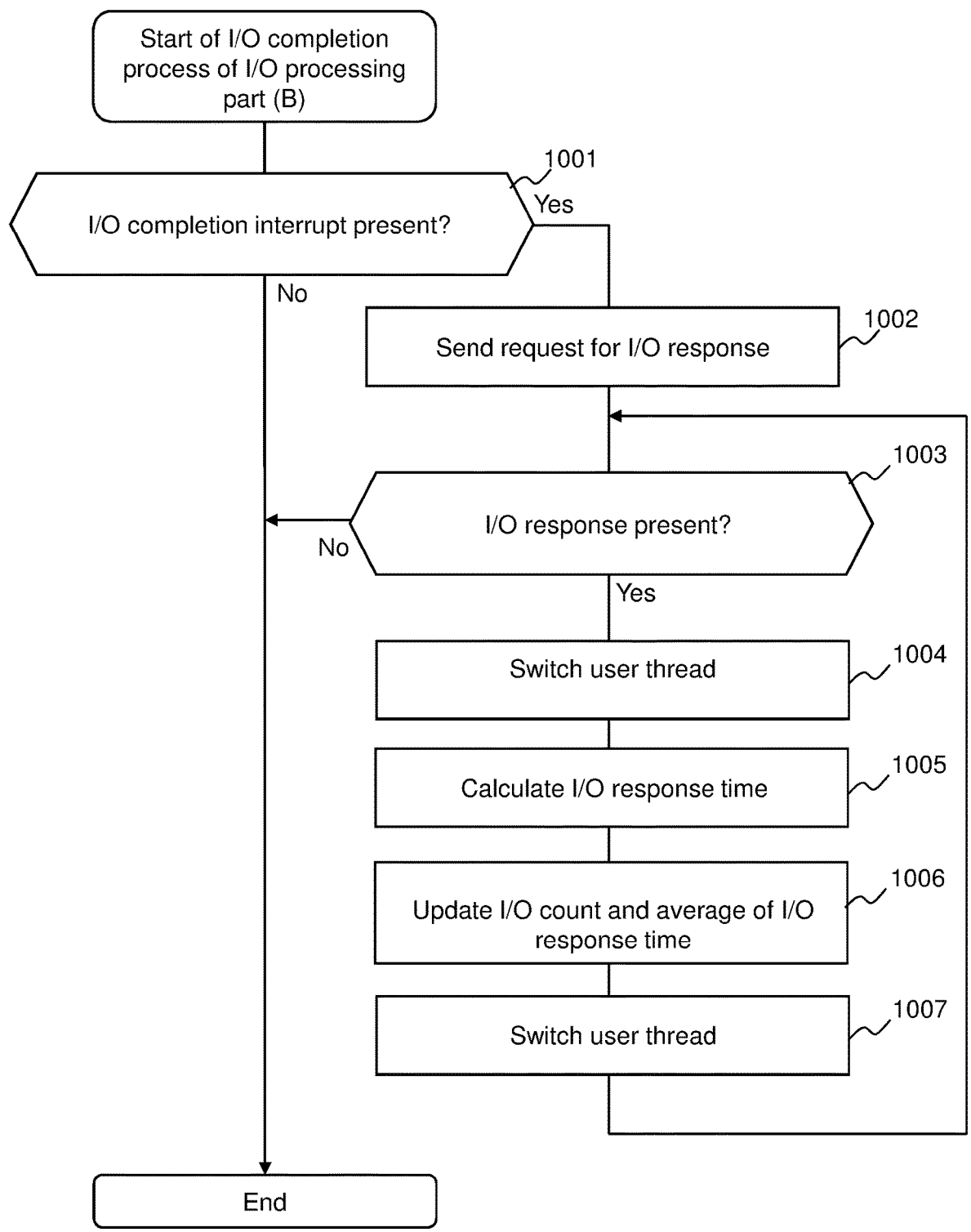
FIG. 10 is a flowchart of an I/O completion process of the I/O processing part (B).

FIG. 10 is a flowchart of an I/O completion process of the I/O processing part (B) 134. The I/O completion process may be executed by a user thread (hereinafter, a dedicated user thread) dedicated for the I/O completion process and may be executed by a user thread that performs a DI3 operation. In the former case, the I/O completion process may be executed repeatedly and may be executed when the turn to use a CPU (CPU core) goes to the dedicated user thread. In the latter case, when step 902 is performed, the I/O completion process may be executed by a user thread that has issued a request to the I/O processing part (B) 134. Moreover, the I/O processing part (A) 132 and the I/O processing part (B) 134 may be further different depending on a difference in the processing method after completion of I/O.

The I/O processing part (B) 134 determines whether an I/O completion interrupt has occurred in the OS 140 (step 1001). When the determination result of step 1001 is false (step 1001: No), the I/O completion process ends.

When the determination result of step 1001 is affirmative (step 1001: Yes), the I/O processing part (B) 134 sends a request to the OS 140 for all I/O responses returned to the OS 140 (step 1002). That is, all I/O responses are collectively harvested from the OS 140.

The I/O processing part (B) 134 determines whether an I/O response is present (step 1003), and ends the I/O completion process when the I/O response is not present (step 1003: No).

When the I/O response is present (step 1003: Yes), the I/O processing part (B) 134 switches an execution target user thread to a user thread which has issued an I/O request corresponding to the I/O response (step 1004). The I/O processing part (B) 134 (or a user thread after the switching in step 1004) acquires an I/O completion time point (the time point at which an I/O response was received by collective harvest in step 1002) and calculates an I/O response time (the time elapsed from the I/O start time point maintained in step 901 of FIG. 9 to the acquired I/O completion time point) (step 1005). Moreover, the I/O processing part (B) 134 (or the user thread after the switching in step 1004) updates the storage device performance information 126, namely, the I/O processing part (B) counts up the number of I/Os corresponding to the I/O destination storage device and updates an average of I/O response time corresponding to the I/O destination storage device (step 1006).

After step 1006, the I/O processing part (B) 134 (or the user thread after the switching in step 1004) switches the execution target user thread to an original user thread which has executed the I/O completion process (step 1007), and the I/O processing part (B) 134 (or the user thread after the switching) executes step 1003.

According to the present example, the DBMS 120 selects any one of the synchronous I/O method and the asynchronous I/O method with which an I/O request is to be issued based on an average of I/O response time of an I/O destination storage device. In this way, it is possible to increase the utilization efficiency of the CPU 104 and to improve the performance of the DBMS 120.

Embodiment 2

Embodiment 2 will be described below. Difference features from Embodiment 1 will be described mainly, and the description of the same features as those of Embodiment 1 will not be provided or may be simplified.

In Embodiment 2, after it is determined whether an average of I/O response time of an I/O destination storage device is shorter than an I/O method selection threshold, auxiliary determination on whether an I/O method corresponding to the determination result can be selected is performed.

Figure 12:
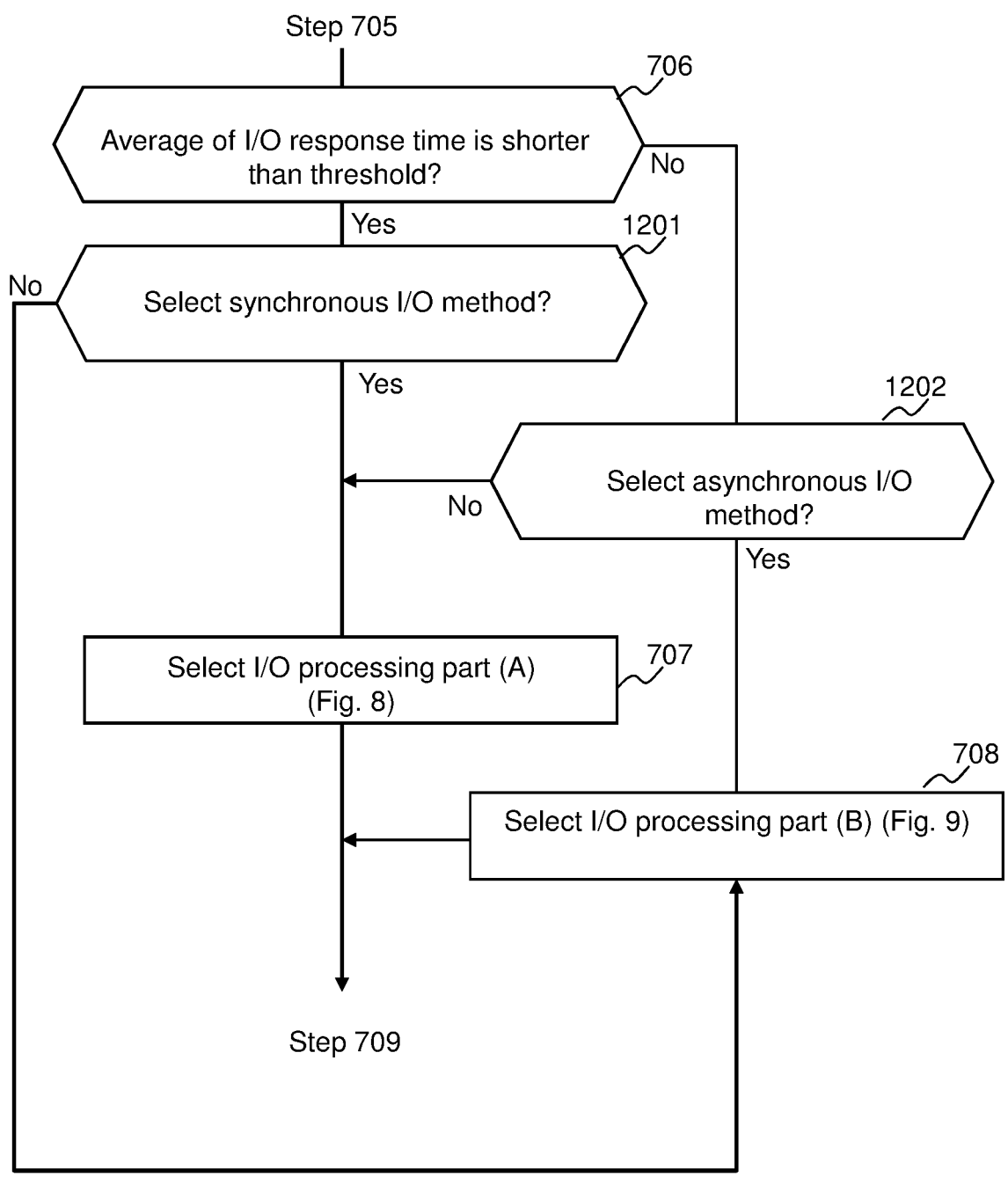
FIG. 12 illustrates a portion of the flowchart of execution of tasks according to Embodiment 2.

FIG. 12 illustrates a portion of the flowchart of execution of tasks according to Embodiment 2.

When an average of I/O response time of an I/O destination storage device is shorter than an I/O method selection threshold (step 706: Yes), the query execution part 122 performs first auxiliary determination on whether it is okay to select the synchronous I/O method (step 1201). When the average of I/O response time of the I/O destination storage device is equal to or larger than the I/O method selection threshold (step 706: No), the query execution part 122 performs second auxiliary determination on whether it is okay to select the asynchronous I/O method (step 1202).

For example, the first auxiliary determination is at least one of (1-1) to (1-2) below.

(1-1) It is determined whether the type of I/O target data is compatible with the synchronous I/O method. Specifically, the query execution part 122 specifies a schema type of DB data to be read based on the query execution plan information 130 and the DB schema management information 204 and determines whether the schema type is a table or an index. When the schema type of the DB data to be read is an index, the query execution part 122 decides that the synchronous I/O method is to be selected (step 1201: Yes). When the schema type of the DB data to be read is a table, the query execution part 122 decides that the asynchronous I/O method is to be selected (step 1201: No). In the DBMS 120 that generates tasks dynamically and executes the tasks in parallel, it is preferable to read the index data which is the base of generation of tasks as early as possible in order to improve the performance of the DBMS 120. On the other hand, even if the reading of table data is late, it has little influence on the performance of the DBMS 120. Thus, according to this auxiliary determination, it is decided that the synchronous I/O method is to be selected when the schema type of the DB data to be read is an index and it is decided that the asynchronous I/O method is to be selected when the schema type of the DB data to be read is a table.

(1-2) It is determined whether a processing method (for example, the type of I/F) of a device driver of an I/O destination storage device is compatible with the synchronous I/O method based on information indicating a processing method of a device driver of each storage device. The information may be input from the outside by an administrator and may be acquired from the storage apparatus 150.

For example, the second auxiliary determination is at least one of (2-1) to (2-3) below.

(2-1) The query execution part 122 determines whether the number of tasks (the product of the CPU core count 400 and the CPU core parallel execution count 402) which can be executed in parallel on all CPU cores is equal to or larger than the number of all tasks executable at that time point by referring to the system information 128. It is assumed that the query execution part 122 allocates an executable task preferentially to a real thread. For example, when the number of real threads is 128, the number of user threads per real thread is 512, and the number of executable tasks is 256, tasks are allocated to two user threads by 128 real threads rather than allocating tasks to 256 user threads by one real thread. When the determination result is affirmative, since the number of user threads that can operate in one real thread is 1 or smaller, the DBMS 120 does not need to switch the user thread by increasing the cost (the usage) of the CPU 104 but selects the synchronous I/O method (the I/O method which does not switch the user thread). In this case, since the real thread having entered into an idle state due to I/O waiting switches to another real thread on the hardware (CPU core) side, the real thread operates as a physical CPU. On the other hand, when the previous determination result is false, since the number of operable user threads per real thread in at least one real thread is 2 or more, the asynchronous I/O method is selected.

(2-2) It is determined whether a processing method of a device driver of an I/O destination storage device is compatible with the asynchronous I/O method based on information indicating a processing method of a device driver of each storage device.

(2-3) It is determined whether it is allowed to increase the number of user threads for which the asynchronous I/O method is selected based on at least one of the upper limit of multiplicity of an I/O request, the number of user threads for which the asynchronous I/O method is selected, and an overhead. At least one of the performance requested for the DBMS 120, the upper limit of the multiplicity of an I/O request, and an overhead time may be input from the outside by an administrator and may be acquired from the storage apparatus 150. When the determination result is affirmative, it is decided that the asynchronous I/O method is to be selected. When the determination result is false, it is decided that the synchronous I/O method is to be selected.

In Embodiment 2, the I/O response speed of each storage device is a fixed value and may be input from an administrator and may be acquired from the storage apparatus 150. Moreover, the I/O response speed of the storage device may be decided based on an I/O performance of the storage device and a path bandwidth of a path to the storage device. At least one of the I/O performance of the storage device and the bandwidth may be input by an administrator and may be acquired from the storage apparatus 150 having the storage device. When at least one of the I/O response speed of the storage device or the I/O performance of the storage device and the bandwidth is a fixed value, the cost (usage) of the CPU 104 can be reduced as compared to measuring the I/O response speed (for example, the average of I/O response time) of each storage device. In this case, for example, even when the I/O response speed (fixed value) exceeds a predetermined speed (step 706 in FIG. 12: Yes), if the I/O destination storage device is busy, the DBMS 120 may decide that the asynchronous I/O method is to be selected (step 1201: No). For example, the "I/O destination storage device being busy" may mean that the path bandwidth of a path to the I/O destination storage device is smaller than a predetermined bandwidth, that a response indicating busy is returned as an I/O response to the I/O request to the I/O destination storage device, or that the I/O response has timed out a predetermined number of times or more. Moreover, the path bandwidth may be a value repeatedly measured by the DBMS 120 and may be a value measured by the storage apparatus 150 and acquired from the storage apparatus 150.

Embodiment 3

Embodiment 3 will be described below. Difference features from Embodiments 1 and 2 will be described mainly, and the description of the same features as those of Embodiments 1 and 2 will not be provided or may be simplified.

Figure 13:
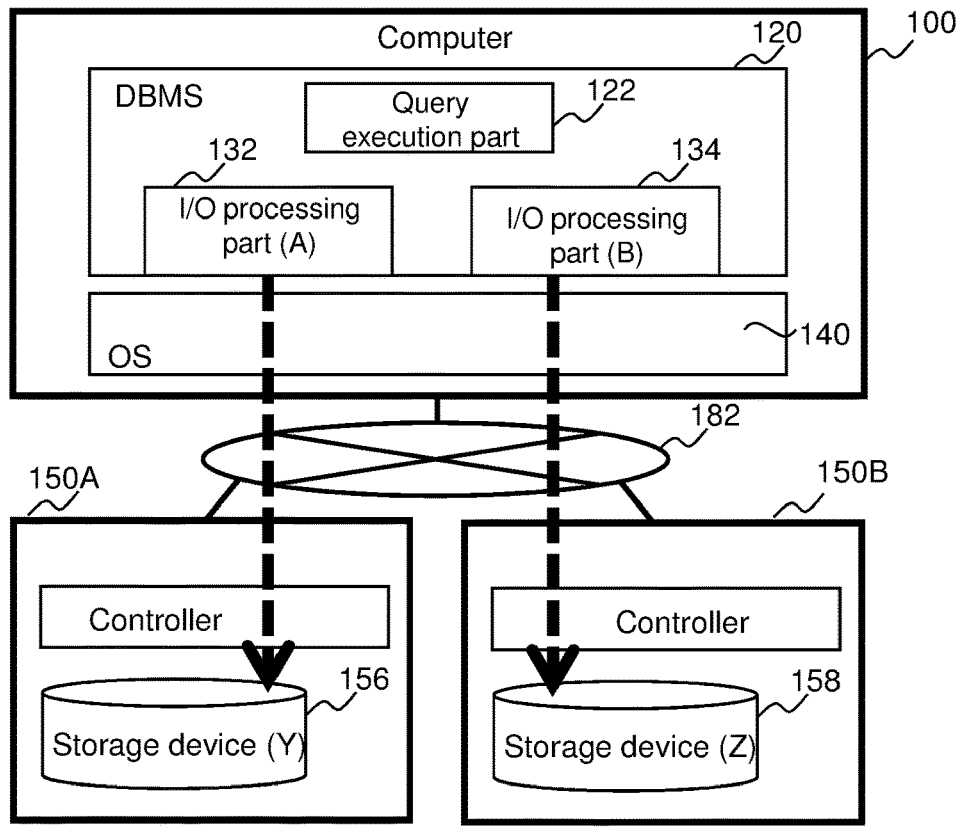
FIG. 13 is a diagram illustrating a configuration example of a computer system according to Embodiment 3.

FIG. 13 is a diagram illustrating a configuration example of a computer system according to Embodiment 3.

A plurality of storage apparatuses 150A and 150B, respectively, having a plurality of storage devices (Y) 156 and (Z) 158 having different I/O response speeds are provided. The computer 100 is coupled to the plurality of storage apparatuses 150A and 150B.

In Embodiment 3, the synchronous I/O method (the I/O processing part (A)) 132 is selected when an I/O destination is the storage device (Y) 156, and the asynchronous I/O method (the I/O processing part (B)) 134 is selected when the I/O destination is the storage device (Z) 158.

Embodiment 4

Embodiment 4 will be described below. Difference features from Embodiments 1 to 3 will be described mainly, and the description of the same features as those of Embodiments 1 to 3 will not be provided or may be simplified.

Figure 14:
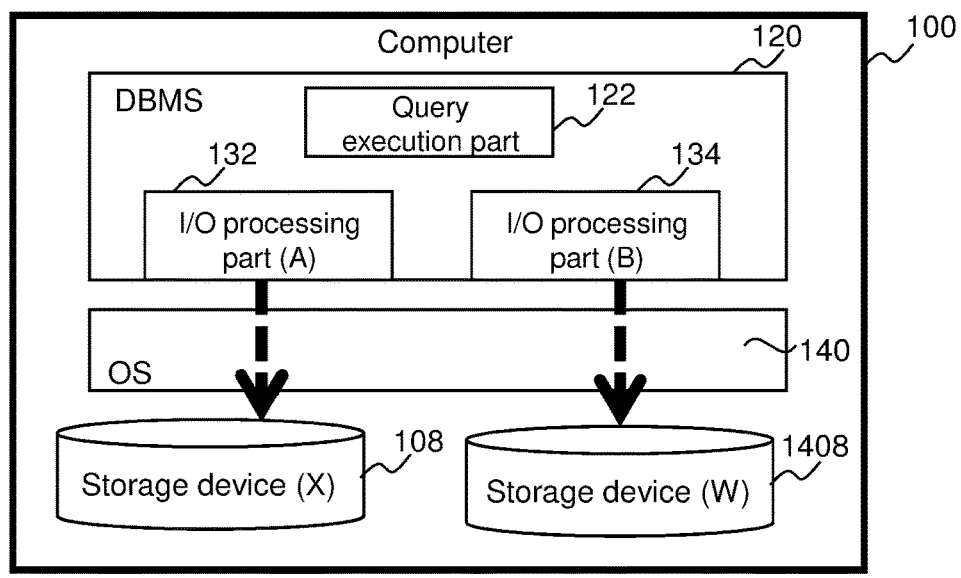
FIG. 14 is a diagram illustrating a configuration example of a computer system according to Embodiment 4.

FIG. 14 is a diagram illustrating a configuration example of a computer system according to Embodiment 4.

A plurality of storage devices (X) 108 and (W) 1408 having different I/O response speeds are present in the computer 100. The storage device (W) 1408 is a HDD, for example. The synchronous I/O method (the I/O processing part (A)) 132 is selected when the I/O destination is the storage device (X) 108, and the asynchronous I/O method (the I/O processing part (B)) 134 is selected when the I/O destination is the storage device (W) 1408.

In Embodiment 4, an in-memory database may be used.

Embodiment 5

Embodiment 5 will be described below. Difference features from Embodiments 1 to 4 will be described mainly, and the description of the same features as those of Embodiments 1 to 4 will not be provided or may be simplified.

Figure 15:
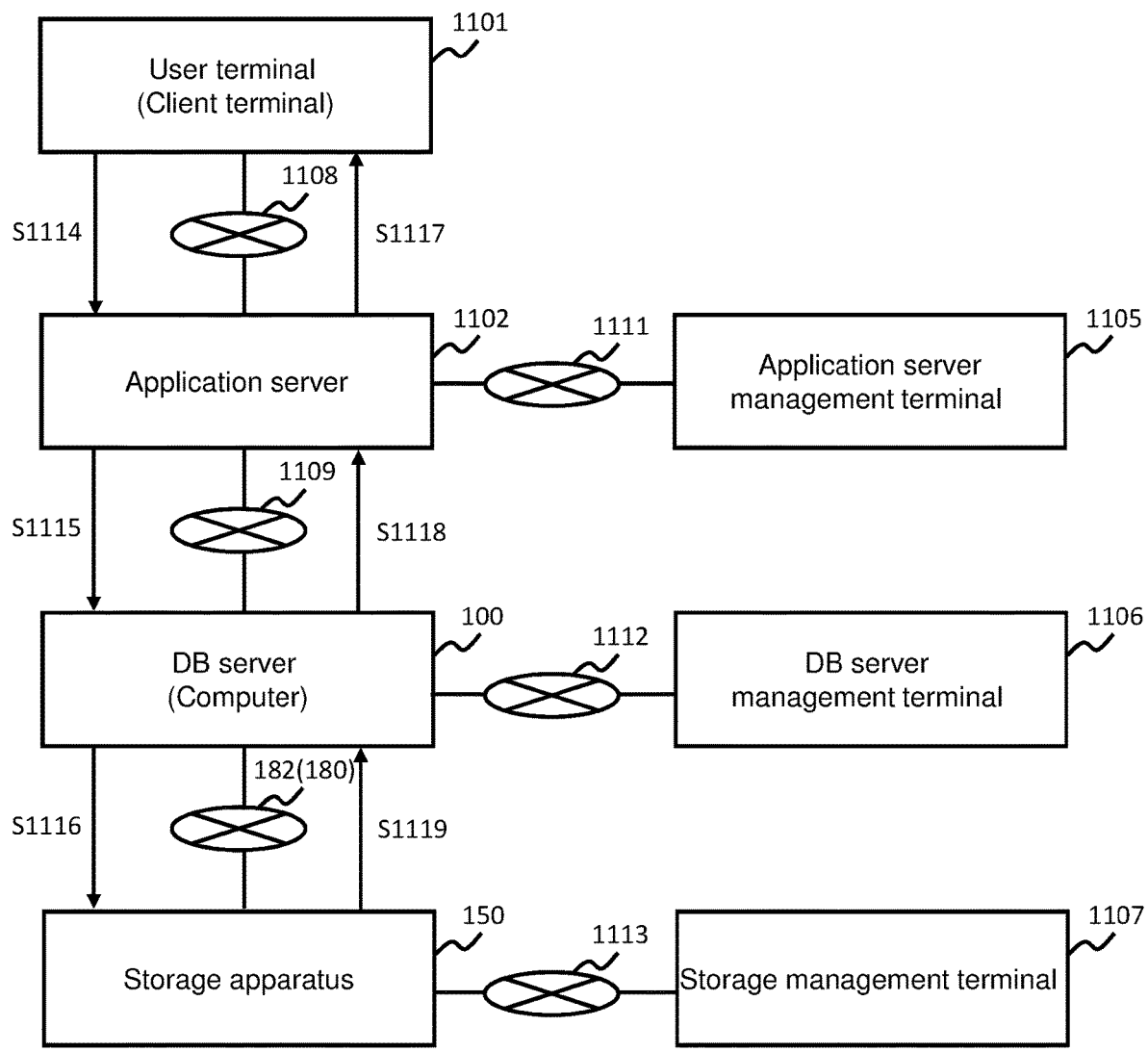
FIG. 15 is a diagram illustrating a configuration example of a computer system according to Embodiment 5.

FIG. 15 is a diagram illustrating a configuration example of a computer system according to Embodiment 5.

An application server 1102 is communicably coupled to the DB server (computer) 100 via a communication network 1109. Moreover, the database server (hereinafter, a DB server) 100 is communicably coupled to the storage apparatus 150 via the communication network 182 (and 180). A user terminal (client terminal) 1101 is communicably coupled to the application server 1102 via a communication network 1108. The DB server 100 executes the DBMS 104 that manages the DB 122. The storage apparatus 150 stores the DB 122. The application server 1102 executes an application program that issues a query to the DBMS 104. The user terminal 1101 issues a request to the application program executed by the application server 1102. A plurality of user terminals 1101 or a plurality of application servers 1102 may be present.

An application server management terminal 1105 is communicably coupled to the application server 1102 via a communication network 1111. A DB server management terminal 1106 is communicably coupled to the DB server 100 via a communication network 1112. A storage management terminal 1107 is communicably coupled to the storage apparatus 150 via a communication network 1113. The application server management terminal 1105 is a terminal that manages the application server 1102. The DB server management terminal 1106 is a terminal that manages the DB server 100. The storage management terminal 1107 is a terminal that manages the storage apparatus 150. At least two of the management terminals 1105 to 1107 may be shared (integrated). Moreover, at least two of the communication networks 182 and 1108 to 1113 may be shared (integrated).

In Embodiment 5, processes are executed in the following manner, for example.

(S1114)

The user terminal 1101 issues a request (hereinafter, a user request) to the application server 1102.

(S1115)

The application server 1102 generates a query according to the user request received in S1114. Moreover, the application server 1102 issues the generated query to the DE server 100.

(S1116)

The DB server 100 receives the query from the application server 1102 and executes the received query. The DB server 100 issues an I/O request (for example, a data read request) necessary for execution of the received query to the storage apparatus 150. The DB server 100 sometimes issues a plurality of I/O requests in parallel in execution of one query. Thus, the DB server 100 sometimes issues the request of S1116 a plurality of times in parallel in execution of one query.

(S1119)

The storage apparatus 150 sends a response to the DB server 100 with respect to the I/O request issued in S1116. The storage apparatus 150 sometimes sends the response of S1119 a plurality of times in parallel.

(S1118)

The DB server 100 generates a query execution result and transmits the query execution result to the application server 1102.

(S1117)

The application server 1102 receives the query execution result. Moreover, the application server 1102 transmits a reply to the user request received in S1114, pursuant to the execution result to the user terminal 1101.

A plurality of user requests may be simultaneously issued to the application server 1102 or a plurality of queries may be simultaneously issued to the DB server.

While several examples have been described, the present invention is not limited to these examples but can be modified in various forms without departing from the spirit thereof.

For example, in any example, the I/O processing part (A) 132 and the I/O processing part (B) 134 each are prepared as one module, and instead of this, the I/O processing part (A) 132 and the I/O processing part (B) 134 may not be present, and a task (in the present example, a user thread) may call a synchronous I/O function or an asynchronous I/O function. Specifically, at least one step among the steps 801 to 805 illustrated in FIG. 8 may be performed by at least one user threads. Moreover, at least one step among the steps 901 to 903 illustrated in FIG. 9 may be performed by at least one user thread. Further, at least one step among the steps 1001 to 1007 illustrated in FIG. 10 may be performed by at least one user threads.

For example, the present invention can be applied to a system (for example, a file system) other than the DBMS. A computer (or a computer system that includes the computer) that executes such a system may include a process request reception part that receives a process request for data stored in a plurality of storage devices having different I/O response speeds and a process request execution part that executes the received process request and executes at least two tasks in parallel among two or more tasks for executing a plurality of operations in execution of the process request. When issuing an I/O request in execution of tasks, the process request execution part may select any one of the synchronous I/O method and the asynchronous I/O method based on the I/O response speed of an I/O destination storage device among the plurality of storage device and may issue an I/O request according to the selected I/O method. In this manner, in a system other than the DBMS, in the above description, a DB operation may be read an operation and a query may be read a process request.

REFERENCE SIGNS LIST

100 Computer
108 Storage device (X)
120 DBMS
122 Query execution part
124 Database management information
126 Storage device performance information
128 System information
130 Query execution plan information
132 I/O processing part (A)
134 I/O processing part (B)
140 OS
142 OS management information
150 Storage apparatus
154 Controller
156 Storage device (Y)
158 Storage device (Z)
172 Control program
174 Storage management information
180, 182 Communication network

The invention claimed is:

1. A database management system comprising:
a processor; and
a memory storing instructions that, when executed by the processor, cause the processor to:
store storage device performance information which includes a plurality of different I/O response speeds for a plurality of storage devices which store a database including a first type of storage device having a first I/O response speed that is greater than a threshold and a second type of storage device having a second I/O response that is not greater than the threshold,
receive a query to the database,
execute the received query, create a plurality of tasks based on an index data and execute at least two tasks in parallel among the plurality of tasks for executing a plurality of database operations in execution of the query,
wherein, for each of the database operations, the processor is further caused to:
acquire an area of the database to be accessed by the respective database operation,
determine whether the acquired area of the database to be accessed by the respective database operation stores the index data or table data,
specify a file path of the acquired area,
specify a device path of the specified file path,
specify an I/O response speed of one of the storage devices corresponding to the specified device path based on the storage device performance information,
when the specified I/O response speed to the acquired area of the database is not greater than the threshold, select an asynchronous I/O method and issue an I/O request to the second type of storage device according to the asynchronous I/O method in which another task can be executed by the processor before the processor receives an I/O response to the I/O request,
when both the specified I/O response speed to the acquired area of the database is greater than the threshold and the acquired area of the database is determined to store the index data for creating the plurality of tasks, select a synchronous I/O method and issue the I/O request to the first type of storage device according to the synchronous I/O method in which another task cannot be executed by the processor before the processor receives an I/O response to the I/O request, and
when both the specified I/O response speed to the acquired area of the database is greater than the threshold and the acquired area of the database is determined to store the table data, select the asynchronous I/O method and issue the I/O request to the second type of storage device according to the asynchronous I/O method in which another task can be executed by the processor before the processor receives an I/O response to the I/O request.

2. The database management system according to claim 1, wherein the processor is further caused to:
determine whether the one of the storage devices corresponding to the specified device path is busy,
when the one of the storage devices corresponding to the specified device path is busy, when the specified I/O response speed is greater than or equal to the threshold and when the acquired area of the database is determined to store the table data, select the asynchronous I/O method and issue the I/O request according to the asynchronous I/O method.

3. The database management system according to claim 1, wherein the processor is further caused to:
determine whether a number of parallel executable tasks is greater than or equal to a number of executable tasks,
when the number of parallel executable tasks is not greater than the number of executable tasks, when the specified I/O response speed is greater than the threshold and when the acquired area of the database is determined to store the table data, select the asynchronous I/O method and issue the I/O request according to the asynchronous I/O method, and when the number of parallel executable tasks is greater than or equal to the number of executable tasks, when the specified I/O response speed is greater than or equal to the threshold and when the acquired area of the database is determined to store the table data, select the synchronous I/O method and issue the I/O request according to the synchronous I/O method.

4. The database management system according to claim 3, wherein the number of parallel executable tasks is a product of a number of CPU cores and a number of the tasks that each of the CPU cores can execute in parallel.

5. The database management system according to claim 1, wherein the process is further caused to:

when the specified I/O response speed is greater than the threshold, further select the asynchronous I/O method based on at least one of an upper limit of multiplicity of the I/O request, the number of tasks for which the asynchronous I/O method is selected, and an overhead associated with the asynchronous I/O method.

6. The database management system according to claim 1, wherein the processor is further caused to:

when the specified I/O response speed is not greater than the threshold, when a device driver of the one of the storage devices corresponding to the specified device path is compatible with the synchronous I/O method and when the acquired area of the database is determined to store the index data, select the synchronous I/O method and issue the I/O request according to the synchronous I/O method, when the specified I/O response speed is greater than the threshold, when the device driver of the one of the storage devices corresponding to the specified device path is compatible with the asynchronous I/O method and when the acquired area of the database is determined to store the index data, select the asynchronous I/O method and issue the I/O request according to the asynchronous I/O method.

7. The database management system according to claim 1, wherein the I/O response speeds of respective storage devices are decided based on a predetermined I/O performance and a bandwidth measured for device path to the respective storage device.

8. The database management system according to claim 1, wherein at least one storage device of the plurality of storage devices is included in a storage apparatus, and wherein the processor is further caused to acquire information indicating an I/O response speed of the at least one storage device included in the storage apparatus or information indicating a bandwidth and an I/O performance of the storage device storage device included in the storage apparatus from the storage apparatus.

9. The database management system according to claim 1, wherein the processor is further caused to dynamically generate the tasks for executing each of the database operations in execution of the query based on the index data, executes the generated tasks, and, when two or more of the tasks are present, executes at least two of the tasks in parallel among the two or more tasks.

10. A computer comprising:

a memory configured to store information on a plurality of different I/O response speeds for a plurality of storage devices which store a database including a first type of storage device having a first I/O response speed that is greater than a threshold and a second type of storage device having a second I/O response that is not greater than the threshold; and a processor programmed to execute a query to the database to create a plurality of tasks based on an index data and execute at least two tasks in parallel among the plurality of tasks for executing a plurality of database operations in execution of the query, wherein, during the execution of each of the database operations, the processor is further programmed to:

acquire an area of the database to be accessed by the respective database operation, determine whether the acquired area of the database to be accessed by the respective database operation stores the index data or table data, specify a file path of the acquired area, specify a device path of the specified file path, specify an I/O response speed of one of the storage devices corresponding to the specified device path based on the storage device performance information, when the specified I/O response speed to the acquired area of the database is not greater than the threshold, select an asynchronous I/O method and issue an I/O request to the second type of storage device according to the asynchronous I/O method in which another task can be executed by the processor before the processor receives an I/O response to the I/O request, when both the specified I/O response speed to the acquired area of the database is greater than the threshold and the acquired area of the database is determined to store the index data for creating the plurality of tasks, select a synchronous I/O method in which another task cannot be executed by the processor before the processor receives an I/O response to the I/O request is returned and issue the I/O request to the first type of storage device according to the synchronous I/O method, and when both the specified I/O response speed to the acquired area of the database is greater than the threshold and the acquired area of the database is determined to store the table data, select the asynchronous I/O method and issue the I/O request to the second type of storage device according to the asynchronous I/O method in which another task can be executed by the processor before the processor receives an I/O response to the I/O request.

11. A database management method comprising:

storing storage device performance information which includes a plurality of different I/O response speeds for a plurality of storage devices which store a database including a first type of storage device having a first I/O response speed that is greater than a threshold and a second type of storage device having a second I/O response that is not greater than the threshold;

receiving a query to the database; and creating a plurality of tasks based on an index data and executing at least two tasks in parallel among the plurality of tasks for executing a plurality of database operations in execution of the received query, and wherein the execution of each of the database operations includes:

acquiring an area of the database to be accessed by the respective database operation, determine whether the acquired area of the database to be accessed by the respective database operation stores the index data or table data, specifying a file path of the acquired area, specifying a device path of the specified file path, specifying an I/O response speed of one of the storage devices corresponding to the specified device path based on the storage device performance information, when the specified I/O response speed to the acquired area of the database is not greater than the threshold, selecting an asynchronous I/O method and issuing an I/O request to the second type of storage device according to the asynchronous I/O method in which another task can be executed by the processor before the processor receives an I/O response to the I/O request, when both the specified I/O response speed to the acquired area of the database is greater than or equal to the threshold and the acquired area of the database is determined to store the index data for creating the plurality of tasks, selecting a synchronous I/O method and issuing the I/O request to the first type of storage device according to the synchronous I/O method in which another task cannot be executed by the processor before the processor receives an I/O response to the I/O request, and when both the specified I/O response speed to the acquired area of the database is greater than the threshold and the acquired area of the database is determined to store the table data, selecting the asynchronous I/O method and issuing the I/O request to the second type of storage device according to the asynchronous I/O method in which another task can be executed by the processor before the processor receives an I/O response to the I/O request.

12. The database management system according to claim 1, wherein the processor is further caused to:

when the specified I/O response speed becomes not greater than the threshold from being greater than the threshold, switch from the synchronous I/O method to select the asynchronous method.

13. The database management system according to claim 1, wherein the processor is further caused to:

when the specified I/O response speed becomes greater than or equal to the threshold, switch from the asynchronous I/O method to select the synchronous method.

* * * * *